United States Patent
Takeuchi et al.

(10) Patent No.: US 7,048,821 B2
(45) Date of Patent: May 23, 2006

(54) PROCESS FOR MANUFACTURING A TRANSPORT BELT

(75) Inventors: Kazutaka Takeuchi, Kanagawa (JP); Shoichi Shimura, Kanagawa (JP); Osamu Kanome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 10/867,793

(22) Filed: Jun. 16, 2004

(65) Prior Publication Data

US 2004/0221949 A1 Nov. 11, 2004

Related U.S. Application Data

(62) Division of application No. 10/105,389, filed on Mar. 26, 2002, now abandoned.

(30) Foreign Application Priority Data

Mar. 28, 2001 (JP) .............................. 2001/092906

(51) Int. Cl.
*B29C 65/00* (2006.01)

(52) U.S. Cl. .................. 156/309.6; 428/36.9; 399/303; 399/313

(58) Field of Classification Search ................ 156/218, 156/308.2, 309.6; 399/303, 313; 428/36.9; 361/234; 271/18.1, 193
See application file for complete search history.

(56) References Cited

U.S. PATENT DOCUMENTS

| | | | | |
|---|---|---|---|---|
| 4,864,461 | A | 9/1989 | Kasahara | 361/234 |
| 5,119,143 | A | 6/1992 | Shimura | 355/289 |
| 5,202,179 | A | 4/1993 | Kasahara | 428/323 |
| 5,283,116 | A | 2/1994 | Tomari et al. | 428/323 |
| 5,404,154 | A | 4/1995 | Tomari et al. | 347/153 |
| 5,944,930 | A | 8/1999 | Takeuchi et al. | 156/218 |
| 6,131,010 | A | 10/2000 | Kume et al. | 399/333 |
| 6,312,543 | B1 | 11/2001 | Takeuchi et al. | 156/218 |
| 6,652,938 | B1 * | 11/2003 | Nishikawa et al. | 428/35.9 |

FOREIGN PATENT DOCUMENTS

| | | |
|---|---|---|
| JP | 8-187773 | 7/1996 |
| JP | 11-151842 | 6/1999 |

\* cited by examiner

*Primary Examiner*—Jeff H. Aftergut
*Assistant Examiner*—John L. Goff
(74) *Attorney, Agent, or Firm*—Fitzpatrick, Cella, Harper & Scinto

(57) ABSTRACT

A transport belt comprising a base member layer formed of a film comprised of a thermoplastic material and wound in the shape of a belt, and a plurality of electrodes arranged at given intervals in the shape of comb teeth on the outer periphery or inner periphery of the first base member layer. The electrodes each comprise a linear film comprised of a thermoplastic material and are joined by heating onto the first base member layer. This transport belt is improved in attraction of recording mediums and enables transport of the recording mediums in a high accuracy. Also disclosed are a process for its manufacture and an image-forming apparatus making use of the same.

8 Claims, 12 Drawing Sheets

PROCESS FOR MANUFACTURING A TRANSPORT BELT

This is a divisional of application Ser. No. 10/105,389, filed on Mar. 26, 2002, now abandoned.

BACKGROUND OF THE INVENTION

1. Field of the Invention

This invention relates to a transport belt used to transport a transport object to a preset position in a high accuracy, and a process for its manufacture. More particularly, this invention relates to a transport belt used to transport recording mediums such as paper and OHP film used in image-forming apparatus such as copying machines, laser beam printers, facsimile machines, ink-jet printers and composite machines of any of these.

2. Related Background Art

As a conventional means for transporting such recording mediums used in electrophotographic apparatus such as copying machines, known is a resin belt formed of a single layer or multiple layer having been controlled to an appropriate resistance value the both sides of which belt is electrostatically charged to impart electric charges to its surface so that the recording mediums can be transported while being attracted thereto by the aid of the electric charges.

In contrast thereto, as shown in FIG. 17, a resin belt 101 on the outer surface or inner surface of which pairs of comb-tooth-shaped electrodes 102 and 103 are continuously formed in the state they engage with one another leaving constant gaps 104 is also known as disclosed in Japanese Patent Publication No. 57-58872. According to this construction, positive and negative voltages are applied to the electrodes 102 and 103, respectively, where a recording medium 105 is transported while being electrostatically locally more strongly attracted to the belt. This electrostatic-attraction transport belt provided with the comb-tooth-shaped electrodes enables stronger attraction of the recording medium to transport it more stably than the one which transport the recording medium only by the aid of the charging of the resin belt as in the above.

Ink-jet recording apparatus of a full-line type making use of a line type recording head having a large number of ejection orifices arranged in the width direction of recording paper to be fed as the recording medium enable achievement of much higher recording speed, and it is more effective to use the above electrostatic-attraction transport belt. As an example in which such an electrostatic-attraction transport belt is used in an ink-jet recording apparatus, one disclosed in Japanese Patent Application Laid-Open No. 11-151842 is available.

As methods used conventionally to manufacture transport belts, available are a heat-melting extrusion method as typified by blown-film extrusion (inflation) and a casting method in which a resin or its precursor is brought into a melt which is then coated on the inner surface and outer surface of a tubular mold in a stated quantity, followed by removal of solvent, and thereafter films formed are peeled.

A method is also disclosed in Japanese Patent Application Laid-Open No. 8-187773 by the present inventors, in which a thermoplastic sheetlike film is wound around a cylindrical member in such a way that the film itself substantially overlaps at its both ends, which is then covered on its outside with a tubular mold member having a smaller coefficient of thermal expansion than the cylindrical member, and these are heated to narrow the gap between the cylindrical member and the tubular mold member and fuse the sheetlike film at its both ends while pressing the ends with a force, to manufacture a tubular film.

To manufacture such an electrostatic-attraction transport belt provided with the comb-tooth-shaped electrodes on the outer surface or inner surface of the belt, it is necessary to prepare the resin belt by the heat-melting extrusion, the casting or the manufacturing method disclosed in Japanese Patent Application Laid-Open No. 8-187773, and join the resin belt, which serve as a base sheet, to a sheet on which an electrode pattern has previously been formed, or form an electrode pattern by various printing on the resin belt formed.

Especially, recording mediums have come required to be transported at a higher speed as the recording speed of image-forming apparatus has been made higher. Hence, in the conventional example in which the resin belt formed of a single layer or multiple layer is charged so that the recording medium can be attraction-transported, there has been a problem that the recording medium may come apart upward from the resin belt without completely resisting the air resistance acting on the recording medium during its transport. As the cause thereof, it is considered that physical external force such as vibration of the belt makes the recording medium tend to come apart upward from the resin belt, or that, when used in ink-jet recording apparatus, the dropping of ink on the recording medium may temporarily lower the resistance value of belt surface to lessen the surface electric charges which attract the recording medium.

Accordingly, in order to achieve higher recording speed of such ink-jet recording type image-forming apparatus, it is preferable to use as the transport belt a composite belt like the one described above, provided with the comb-tooth-shaped electrodes which enable the recording medium to be strongly and continuously electrostatically attracted to the surface of the transport belt.

Where such a composite belt provided with the comb-tooth-shaped electrodes is manufactured by the heat-melting extrusion method (such as blown-film extrusion), it is usually necessary to continuously wind up the transport belt having been produced in a tubular form. However, when such a tubular belt is folded when it is wound up and if any fold is made, the fold may inevitably affect the images to be recorded on the recording medium. On the other hand, if, in order to prevent it, the transport belt thus produced is cut into endless belts as it is kept tubular, a long forming line must be provided to require a large space, resulting in a high manufacture cost.

Where the composite belt provided with the comb-tooth-shaped electrodes is manufactured by the casting method, there is a problem that much cost is required because the management of concentration of solutions and the control of drying atmosphere must accurately be made in order to obtain films with uniform thickness and also the solvent vapor occurring in the drying step must be disposed of.

The composite belt provided with the comb-tooth-shaped electrodes can also be manufactured by preparing the resin belt by the heat-melting extrusion, the casting or the manufacturing method disclosed in Japanese Patent Application Laid-Open No. 8-187773, and thereafter forming thereon the electrode pattern by various printing. In such a case, however, as a matter of course, a higher manufacture cost should result for the part corresponding to the formation of the electrode pattern than in the case of the resin belt prepared by the heat-melting extrusion, the casting or the manufacturing method disclosed in Japanese Patent Application Laid-Open No. 8-187773,

SUMMARY OF THE INVENTION

The present invention has been made taking account of the above problems. Accordingly, an object of the present invention is to provide a transport belt improved in attraction of recording mediums, which is used to transport recording mediums in image-forming apparatus.

Another object of the present invention is to provide a process by which the transport belt improved in attraction of recording mediums can be manufactured at a low cost.

Still another object of the present invention is to provide an image-forming apparatus which can form recorded images with a higher quality.

To achieve the above objects, the transport belt of the present invention comprises a first base member layer formed of a film comprised of a thermoplastic material and wound in the shape of a belt, and a plurality of electrodes arranged at given intervals in the shape of comb teeth on the outer periphery or inner periphery of the first base member layer, wherein;

the electrodes each comprise a film comprised of a thermoplastic material, formed in a line, and are joined by heating onto the first base member layer.

In the transport belt of the present invention, both the film constituting a base member layer and the film constituting electrodes are formed of a thermoplastic material. This enables manufacture of the transport belt with a uniform thickness without causing any fold. Hence, the transport belt of the present invention can be improved in attraction of recording mediums, and enables the recording medium to be transported in a high accuracy.

DESCRIPTION OF THE PREFERRED EMBODIMENTS

Figure 1:
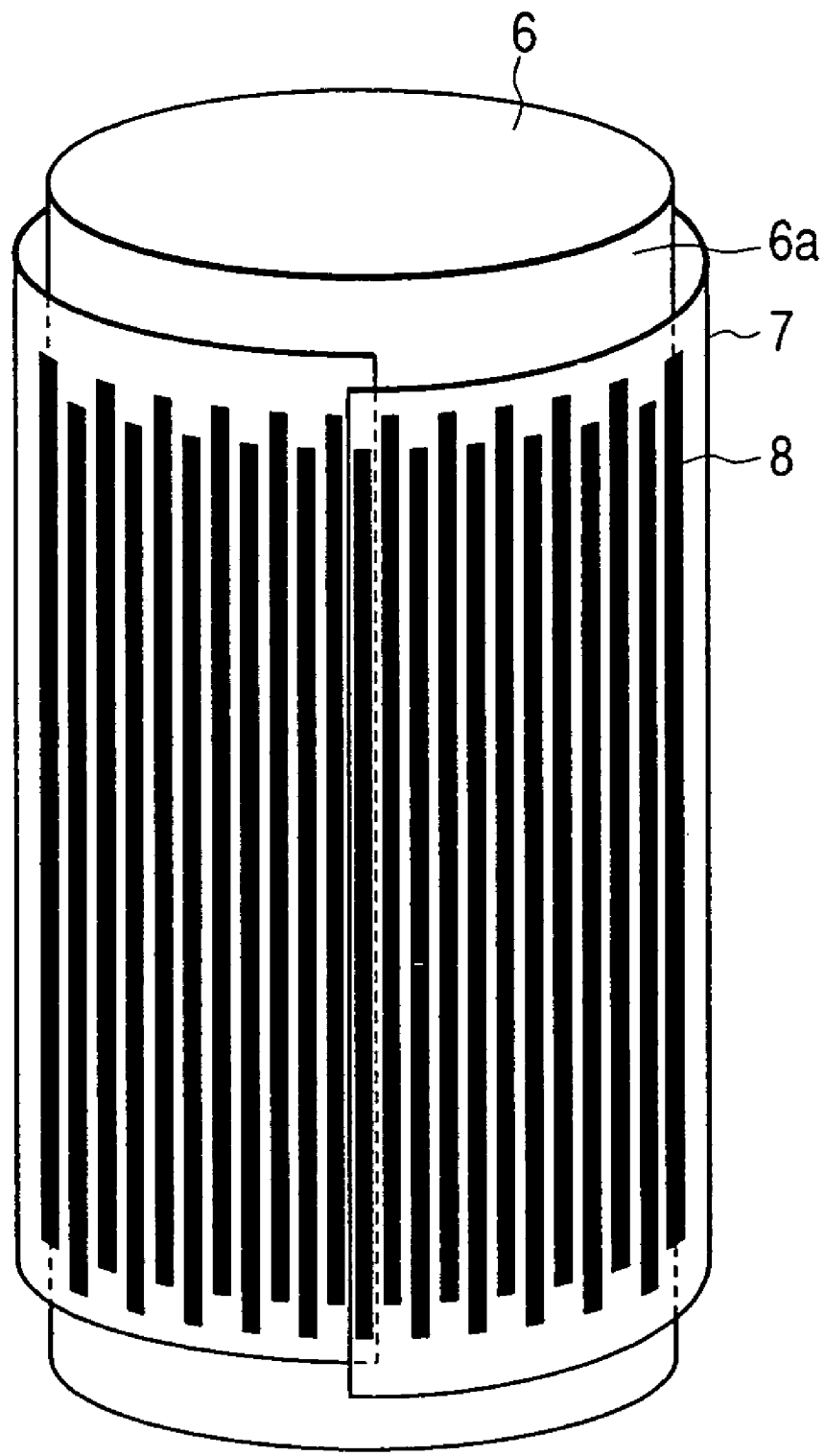
FIG. 1 is a perspective illustration of how a sheetlike film serving as a base member layer of a transport belt according to First Embodiment of the present invention is wound around a cylindrical member and a plurality of linear films serving as electrodes are arranged on the surface of the sheetlike film.

The transport belt of the present invention comprises a first base member layer formed of a film comprised of a thermoplastic material and wound in the shape of a belt, and a plurality of electrodes arranged at given intervals in the shape of comb teeth on the outer periphery or inner periphery of the first base member layer. The electrodes each comprise a film formed of a thermoplastic material and are joined by heating onto the first base member layer.

The transport belt of the present invention may preferably be so constructed that the thermoplastic material constituting the electrodes has a volume resistivity which is lower than the volume resistivity of the thermoplastic material constituting the first base member layer.

The transport belt of the present invention may also preferably be so constructed that the thermoplastic material constituting the electrodes has a volume resistivity which is lower than $1.0 \times 10^5$ Ω·cm.

The transport belt of the present invention may still also be so constructed that a second base member layer formed of a film comprised of a thermoplastic material and wound in the shape of a belt is so provided as to hold the electrodes between the first base member layer and the second base member layer.

The transport belt of the present invention may still also be so constructed that the thermoplastic material constituting the base member layer positioned on the outer peripheral side in the first base member layer and second base member layer has a volume resistivity which is higher than the volume resistivity of the thermoplastic material constituting the electrodes and is lower than the volume resistivity of the thermoplastic material constituting the base member layer positioned on the inner peripheral side in the first base member layer and second base member layer. This makes conducting paths more concentrate on the outer periphery (the side to which the recording medium is attracted) of the transport belt than the inner periphery of the transport belt to enable stronger attraction of the recording medium.

The transport belt of the present invention may also be so constructed that an intermediate layer comprised of a thermoplastic material is provided at spaces between electrodes adjoining to each other which are held between the first base member layer and the second base member layer, with which intermediate layer the spaces are filled up. This makes the surface of the transport belt less uneven, so that the images to be formed on the recording medium transported by the transport belt can be formed in a higher image quality.

The above transport belt of the present invention may also be so constructed that the thermoplastic material constituting the intermediate layer has the same volume resistivity as the volume resistivity of the thermoplastic material constituting the first base member layer.

The above transport belt of the present invention may still also be so constructed that the thermoplastic materials constituting the respective layers (films) comprise a like base material.

The process for manufacturing the transport belt of the present invention is a process for producing a transport belt comprising a base member layer formed of a film comprised of a thermoplastic material and wound in the shape of a belt, and a plurality of electrodes arranged at given intervals in the shape of comb teeth on the outer periphery of the base member layer; the process comprising the steps of:

winding around a cylindrical member a sheetlike film comprised of the thermoplastic material making up the base member layer;

arranging a plurality of linear films comprised of a thermoplastic material making up the respective electrodes, on the outer periphery of the sheetlike film wound around the cylindrical member, and at given intervals in the shape of comb teeth; and inserting into a tubular mold member the cylindrical member with these films, followed by heating in the state that the respective films are so held between the cylindrical member and the tubular mold member as to be capable of being pressed against each other, to join the sheetlike film at its ends and simultaneously join the films to each other at their part coming into contact with each other.

According to the process for manufacturing the transport belt of the present invention, the film which forms the base member layer and the films which form the electrodes can be joined with ease by heating these. This enables manufacture of the transport belt having a uniform thickness without causing any fold. Hence, the transport belt of the present invention can be improved in attraction of recording mediums, and enables the recording medium to be transported in a high accuracy.

The above process of the present invention may also preferably be so constructed that the thermoplastic material constituting the electrodes has a volume resistivity which is lower than the volume resistivity of the thermoplastic material constituting the base member layer.

The above process of the present invention may still also preferably be so constructed that the thermoplastic material constituting the electrodes has a volume resistivity which is lower than $1.0 \times 10^5$ Ω·cm.

Another process for manufacturing the transport belt according to the present invention is a process for producing a transport belt comprising a first base member layer formed of a film comprised of a thermoplastic material and wound in the shape of a belt, a plurality of electrodes arranged at given intervals in the shape of comb teeth on the outer periphery of the first base member layer, and a second base member layer formed of a film comprised of a thermoplastic material and wound in the shape of a belt, which is so provided as to hold the electrodes between the first base member layer and the second base member layer; the process comprising the steps of:

winding around a cylindrical member a first sheetlike film comprised of the thermoplastic material making up the first base member layer;

arranging a plurality of linear films comprised of a thermoplastic material making up the respective electrodes, on the outer periphery of the first sheetlike film wound around the cylindrical member, and at given intervals in the shape of comb teeth;

winding around the first base member layer a second sheetlike film comprised of a thermoplastic material making up the second base member layer; and inserting into a tubular mold member the cylindrical member with these films, followed by heating in the state that the respective films are so held between the cylindrical member and the tubular mold member as to be capable of being pressed against each other, to join each of the first and second sheetlike films at their ends and simultaneously join the films to each other at their part coming into contact with each other.

In the above manufacturing process, the process may be so constructed that the thermoplastic material constituting the second base member layer has a volume resistivity which is higher than the volume resistivity of the thermoplastic material constituting the electrodes and is lower than the volume resistivity of the thermoplastic material constituting the first base member layer. This makes conducting paths more concentrate on the outer periphery (the side to which the recording medium is attracted) of the transport belt than the inner periphery of the transport belt to enable manufacture of a transport belt which can make stronger attraction of the recording medium.

Still another process for manufacturing the transport belt according to the present invention is a process for producing a transport belt comprising a first base member layer formed of a film comprised of a thermoplastic material and wound in the shape of a belt, a plurality of electrodes arranged at given intervals in the shape of comb teeth on the outer periphery of the first base member layer, a second base member layer formed of a film comprised of a thermoplastic material and wound in the shape of a belt, which is so provided as to hold the electrodes between the first base member layer and the second base member layer, and an intermediate layer comprised of a thermoplastic material, provided at spaces between electrodes adjoining to each other which are held between the first base member layer and the second base member layer; the process comprising the steps of:

winding around a cylindrical member a first sheetlike film comprised of the thermoplastic material making up the first base member layer;

winding around the first base member layer a sheetlike film with fitting openings which is comprised of a thermoplastic material making up the intermediate layer and has a plurality of fitting openings arranged at given intervals in the shape of comb teeth;

fitting in the fitting openings of the film with fitting openings a plurality of linear films comprised of a thermoplastic material making up the respective electrodes;

winding around the film with fitting openings a second sheetlike film comprised of a thermoplastic material making up the second base member layer; and inserting into a tubular mold member the cylindrical member with these films, followed by heating in the state that the respective films are so held between the cylindrical member and the tubular mold member as to be capable of being pressed against each other, to join each of the first and second sheetlike films and the film with fitting openings at their ends and simultaneously join the films to each other at their part coming into contact with each other.

This process makes the surface of the transport belt less uneven to enable low-cost manufacture of a transport belt with which the images to be formed on the recording medium transported by the transport belt can be formed in a higher image quality.

In the above manufacturing process, the process may be so constructed that the thermoplastic material constituting the second base member layer has a volume resistivity which is higher than the volume resistivity of the thermoplastic material constituting the electrodes and is lower than the volume resistivity of the thermoplastic material constituting the first base member layer, and that the thermoplastic material constituting the intermediate layer has the same volume resistivity as the volume resistivity of the thermoplastic material constituting the first base member layer.

A further process for manufacturing the transport belt according to the present invention is a process for producing a transport belt comprising a first base member layer formed of a film comprised of a thermoplastic material and wound in the shape of a belt, a plurality of electrodes arranged at given intervals in the shape of comb teeth on the outer periphery of the first base member layer, a second base member layer formed of a film comprised of a thermoplastic material and wound in the shape of a belt, which is so provided as to hold the electrodes between the first base member layer and the second base member layer, and an intermediate layer comprised of a thermoplastic material, provided at spaces between electrodes adjoining to each other which are held between the first base member layer and the second base member layer; the process comprising the steps of:

winding around a cylindrical member a first sheetlike film comprised of the thermoplastic material; the first sheetlike film having in an integral form the part forming the first base member layer and the part forming the intermediate layer, having a plurality of fitting openings arranged at given intervals in the shape of comb teeth which openings have been made in the part forming the intermediate layer, and being so wound that the part forming the intermediate layer is superposed on the part forming the first base member layer;

fitting in the fitting openings of the first sheetlike film a plurality of linear films comprised of a thermoplastic material making up the respective electrodes;

winding around the first sheetlike film with these films a second sheetlike film comprised of a thermoplastic material making up the second base member layer; and inserting into a tubular mold member the cylindrical member with these films, followed by heating in the state that the respective films are so held between the cylindrical member and the tubular mold member as to be capable of being pressed against each other, to join each of the first and second sheetlike films at their ends and simultaneously join the films to each other at their part coming into contact with each other.

This process makes the surface of the transport belt less uneven to enable simpler and lower-cost manufacture of a transport belt with which the images to be formed on the recording medium transported by the transport belt can be formed in a higher image quality.

In the above manufacturing process, the process may be so constructed that the thermoplastic material constituting the second base member layer has a volume resistivity which is higher than the volume resistivity of the thermoplastic material constituting the electrodes and is lower than the volume resistivity of the thermoplastic material constituting the first base member layer.

The above process of the present invention may also be so constructed that the thermoplastic materials constituting the respective films comprise a like base material.

Any of the above processes of the present invention may also preferably be so constructed that the cylindrical member has a coefficient of thermal expansion which is larger than the coefficient of thermal expansion of the tubular mold member. This makes gradually narrow the gap between the outer periphery of the cylindrical member and the inner periphery of the tubular mold member because of the difference in coefficient of thermal expansion between the both when heated in the state the cylindrical member with films is inserted into the tubular mold member, so that the films standing between the both can be heated in the state the former is tightly held between the latter.

The image-forming apparatus of the present invention comprises a recording means for forming an image on a recording medium and a transport means for transporting the recording medium, wherein the transport means comprises the above transport belt of the present invention, which is rotatingly driven by a drive means, and an electrical-feed means for feeding electricity to the electrodes of the transport belt. According to this image-forming apparatus, the recording medium can be transported at a high accuracy by means of the transport belt described above, having been improved in attraction of recording mediums, and hence recorded images with a higher image quality can be formed.

The apparatus of the present invention may also be so constructed that the above recording means is an ink-jet recording head which ejects an ink out of nozzles to form images.

Specific embodiments of the present invention are described below with reference to the accompanying drawings.

First Embodiment

FIGS. 1 to 7 are illustrations used to describe the construction of First Embodiment of the transport belt according to the present invention and its manufacturing process.

As shown in FIG. 1, the transport belt according to this embodiment has a sheetlike film 7 which forms the former's base member layer. Used as this film is, e.g., a polyvinylidene fluoride resin (hereinafter called "PVdF resin") film of 100 µm in layer thickness, cut into a sheet of 945 mm×270 mm in length and breadth dimensions. Such dimensions may appropriately be selected in accordance with the inner diameter of the transport belt to be manufactured. On the surface of this sheetlike film 7, linear films 8 which form electrodes, comprised of the like PVdF resin, are arranged in the shape of comb teeth in such a way that they are alternately shifted in the width direction of the sheetlike film.

A cylindrical member 6 serving as a shaft around which the sheetlike film 7 is to be wound is also used. In this embodiment, it is constructed in a solid rod. In this embodiment, the cylindrical member 6 is formed of aluminum having a coefficient of thermal expansion of $2.4 \times 10^{-5}/°$ C., and is of 300.0 mm in diameter and 300.0 mm in length.

Figure 2:
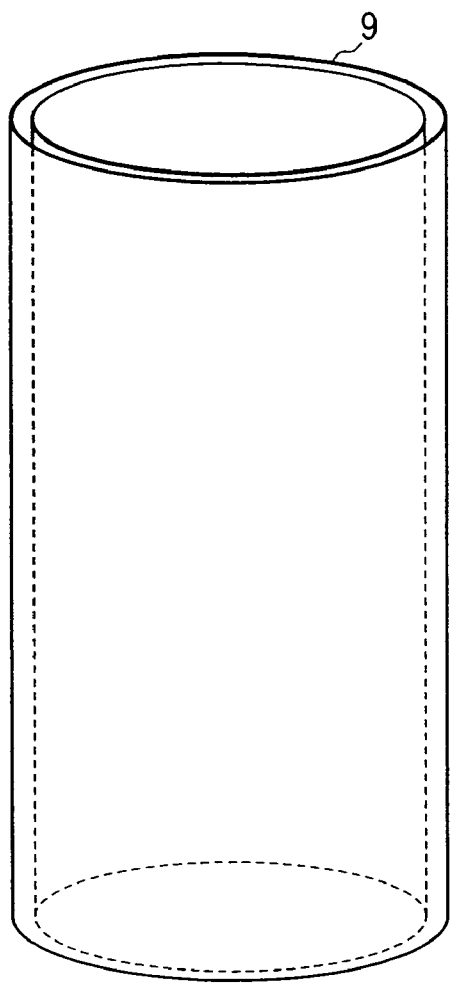
FIG. 2 is a perspective illustration of a tubular mold member into which the cylindrical member around which the sheetlike film has been wound is to be inserted.

Meanwhile, a tubular mold member 9 shown in FIG. 2 has inner diameter necessary for the cylindrical member 6 to be inserted thereinto in the state the sheetlike film 7 is wound around it. In this embodiment, it is 300.7 mm in inner diameter, 320.0 mm in outer diameter and 300.0 mm in length. The tubular mold member 9 is formed of stainless steel having a coefficient of thermal expansion of $1.5 \times 10^{-5}/°$C.

Thus, the tubular mold member 9 has a larger coefficient of thermal expansion than the cylindrical member 6 so that the cylindrical member 6 and the tubular mold member 9 may come to have a size difference of 200 µm±20 µm between the outer diameter of the cylindrical member 6 and the inner diameter of the tubular mold member 9 when heated to 210° C. in a heating step described later. Also, dimensions of the cylindrical member 6 and those of the tubular mold member 9 may be determined in accordance with the size of the sheetlike film 7.

Steps of manufacturing the transport belt of this embodiment are described below.

Figure 3:
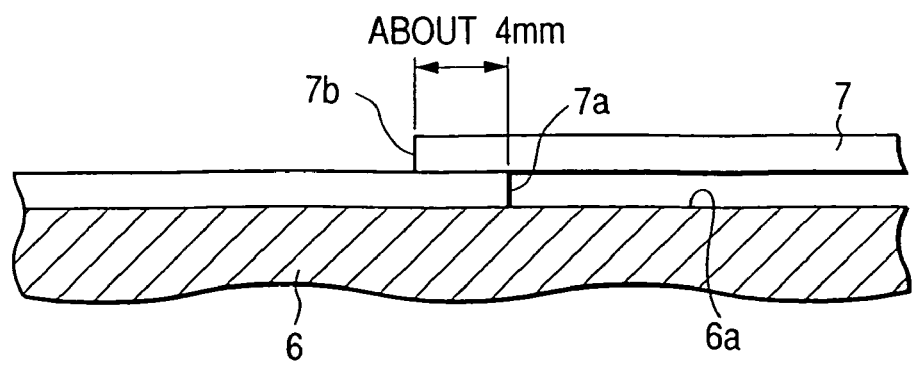
FIG. 3 is an illustration of the part where the sheetlike film wound around the cylindrical member overlaps at its both ends.

First, as shown in FIG. 1, the sheetlike film 7 serving as the base member layer is wound on the outer periphery 6a of the cylindrical member 6 in such a way that the film itself overlaps at its both ends 7a and 7b as shown in FIG. 3. Here, the film 7 overlaps at the both ends 7a and 7b in a width of about 4.0 mm. In this embodiment, the sheetlike film 7 is wound on the outer periphery 6a of the cylindrical member 6 only by one round, and hence the sheet 7 itself is made to overlap at its both ends 7a and 7b in this way. Where, however, the sheetlike film 7 is wound on the outer periphery 6a of the cylindrical member 6 by a plurality of rounds, it need not necessarily be made to overlap at the both ends 7a and 7b.

Figure 17:
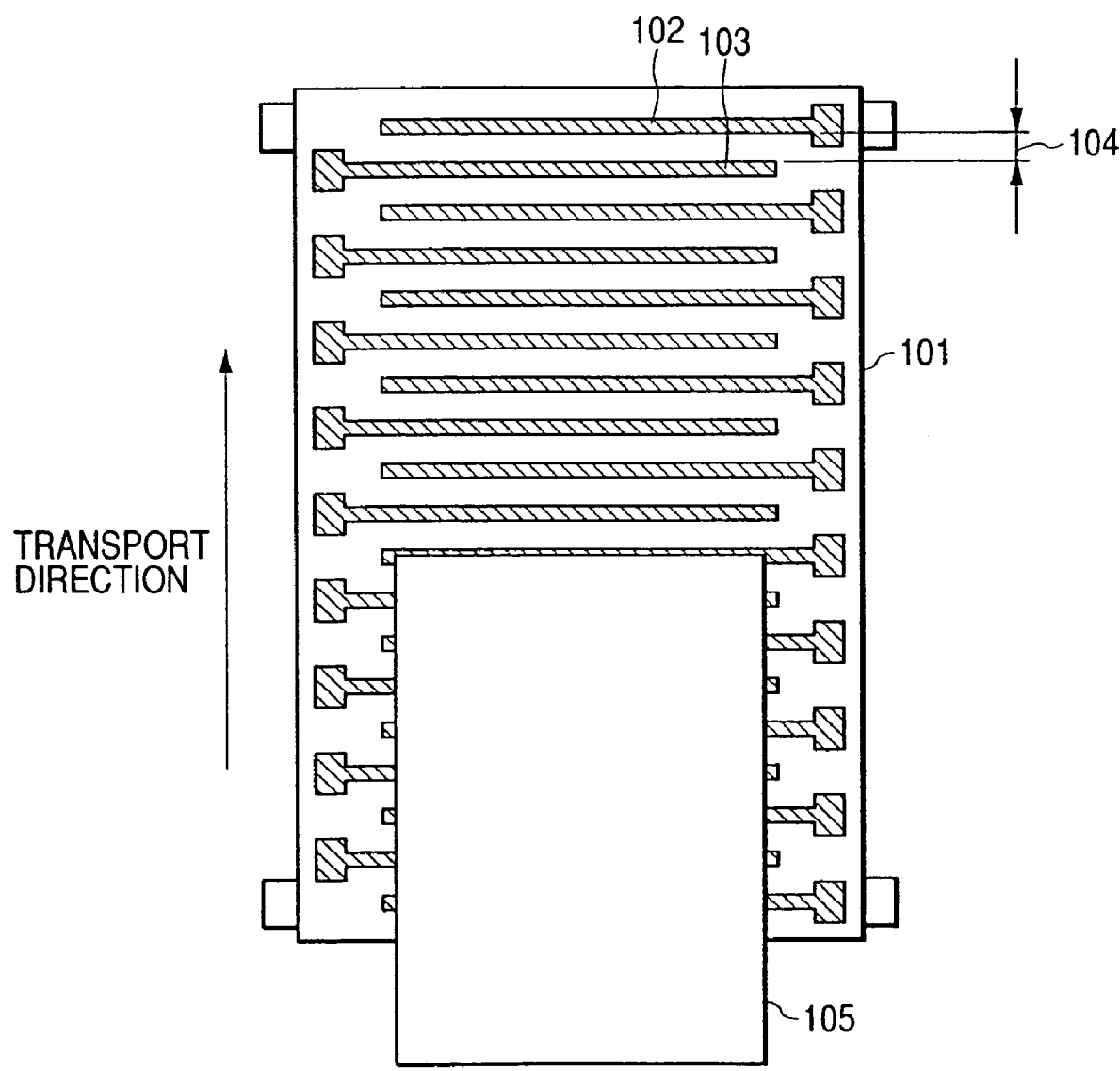
FIG. 17 illustrates a recording medium transport mechanism in a conventional image-forming apparatus.

Next, as shown in FIG. 1, on the surface of the sheetlike film 7 wound on the cylindrical member 6, linear films 8 cut in lines of 50 µm in thickness, 8 mm in width and 200 mm in length are arranged at intervals of 3 mm one another in the shape of comb teeth in such a way that they are alternately shifted in the width direction of the sheetlike film 7. As a base material of the linear films 8, the same PVdF resin as that used in the sheetlike film 7 is used, provided that particles of KETJEN BLACK (trade name), which is high-performance conductive carbon black, are mixed in the linear films 8 so that, while the sheetlike film 7 has a volume resistivity of $1.0 \times 10^{13}$ Ω·cm, the linear films 8 may have a volume resistivity of $1.0 \times 10^{2}$ Ω·cm. Hence, the linear films 8 function as electrodes. It is nothing but an example that the linear films 8 have been made to have the volume resistivity of $1.0 \times 10^{2}$ Ω·cm. The linear films 8 can be made to serve as electrodes as long as its value is smaller than $1.0 \times 10^{5}$ Ω·cm. Also, the linear films 8 may have any shape as long as they can serve as electrodes. They may be in a linear shape as in this embodiment, or may have the shape of an elongated "T" as shown in FIG. 17.

Figure 4:
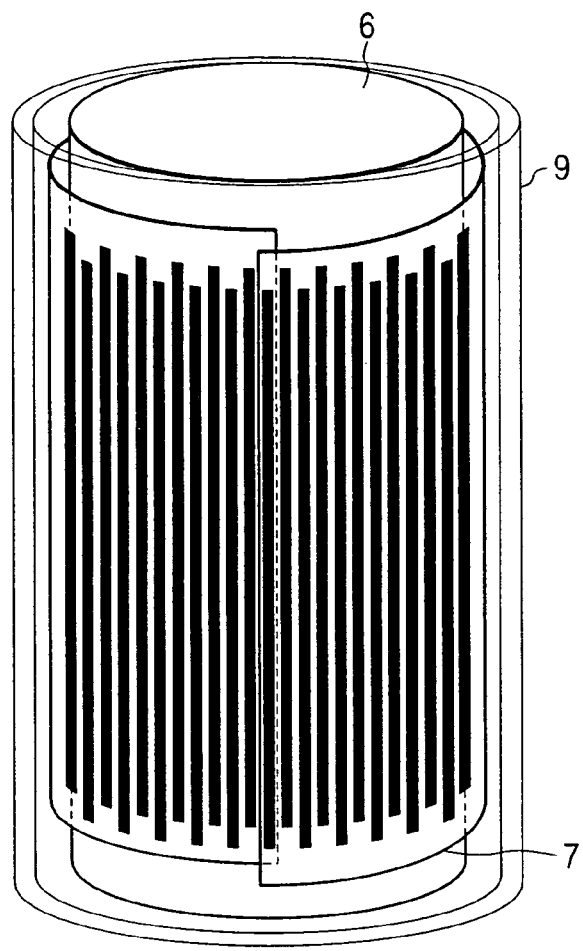
FIG. 4 is a see-through, perspective illustration of how the cylindrical member around which the sheetlike film has been wound is inserted into the tubular mold member.
Figure 5:
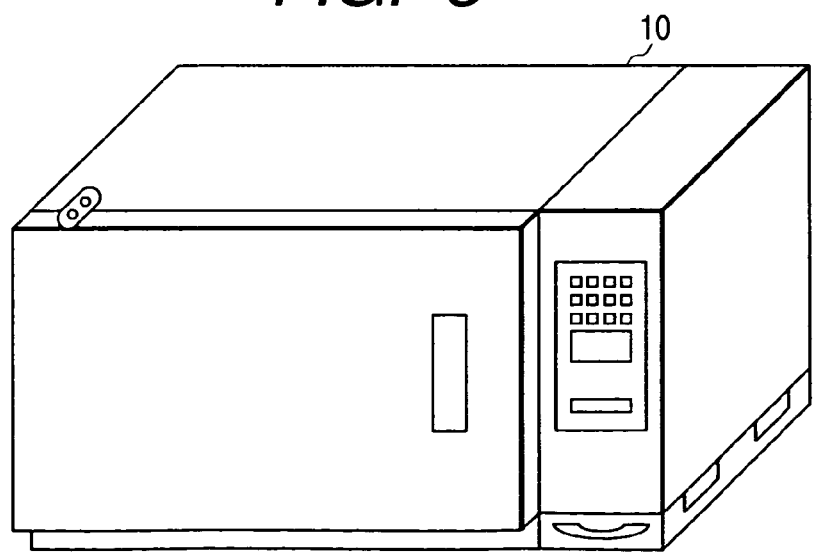
FIG. 5 a perspective illustration of a heating furnace used to heat the sheetlike film and the linear films.

Subsequently, as shown in FIG. 4, the cylindrical member 6 around which the sheetlike film 7 with films 8 is kept wound is inserted into the hollow part of the tubular mold member 9. This assemblage is put into a heating furnace 10 shown in FIG. 5 and heated. Conditions for the heating in the heating furnace 10 are a heating temperature of 210±5° C. and a heating time of 60±1 minutes. This heating time may be determined taking account of the melting temperature of materials for the films 7 and 8 and the state of heat deterioration. Incidentally, what is shown in FIG. 4 is in the state the cylindrical member 6 and sheetlike film 7 inserted into the tubular mold member 9 are seen through.

Figure 6A:
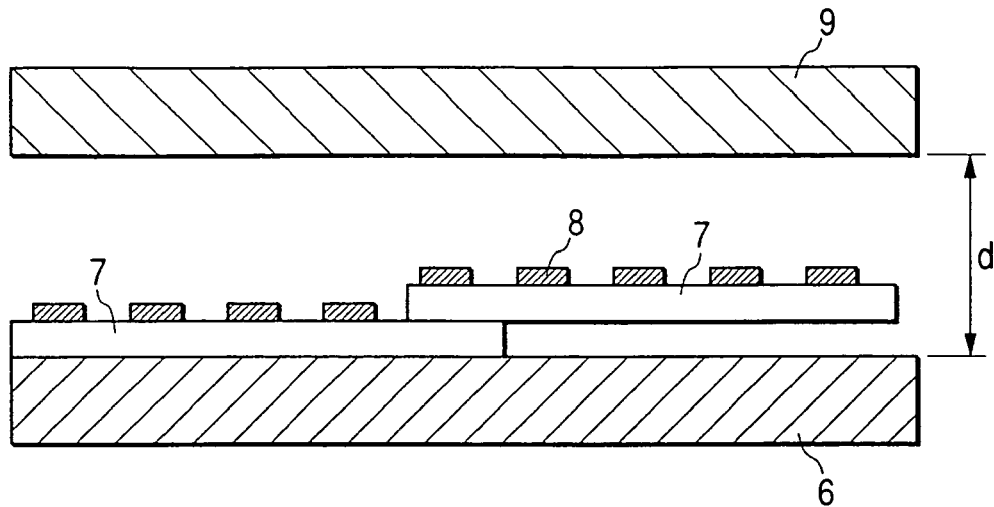
FIGS. 6A, 6B and 6C illustrate the step of heating the sheetlike film and the linear films.
Figure 6B:
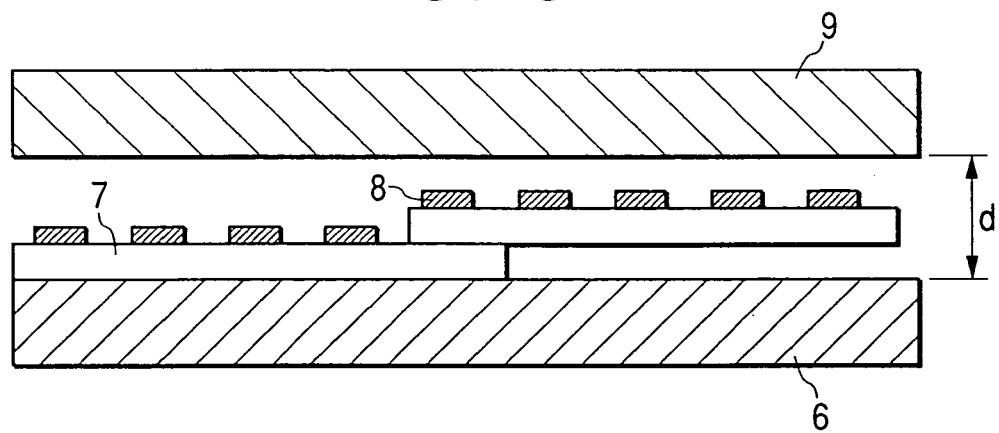
Figure 6C:
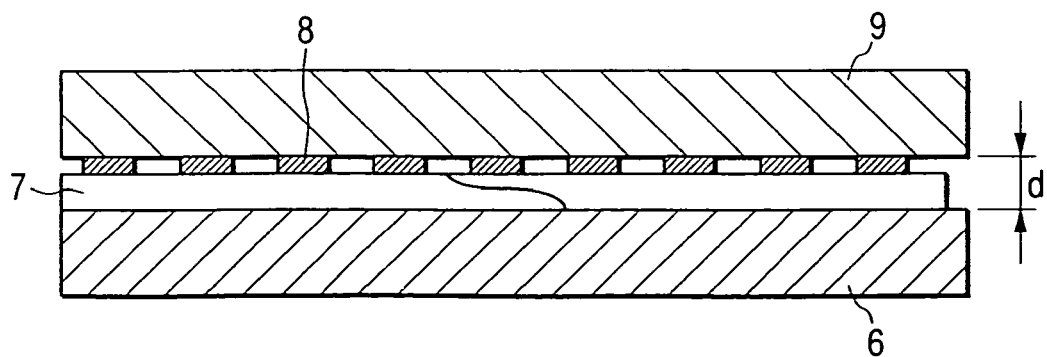

When heated in the heating furnace 10, the sheetlike film 7 and the linear films 8 come worked as shown in FIGS. 6A to 6C.

As shown in FIG. 6A, before heating, there is a gap d of 350 µm between the outer periphery of the cylindrical member 6 and the inner periphery of the tubular mold member 9 because of a size difference of 700 µm between the outer diameter of the cylindrical member 6 and the inner diameter of the tubular mold member 9. The heating is started from this condition, whereupon the members 6 and 9 begin expanding in accordance with their coefficients of thermal expansion and the films 7 and 8 begin softening with rise of temperature.

As described previously, since the aluminum which is the material of the cylindrical member 6 has a larger coefficient of thermal expansion than the coefficient of thermal expansion of the stainless steel which is the materials of the tubular mold member 9, the cylindrical member 6 more expands than the tubular mold member 9, so that, with rise of temperature, the gap d between the outer periphery of the cylindrical member 6 and the inner periphery of the tubular mold member 9 becomes gradually narrower than the initial condition (see FIG. 6B).

With further progress of expansion, the gap d becomes further narrower, until the films 7 and 8 come tightly held between the outer periphery of the cylindrical member 6 and the inner periphery of the tubular mold member 9. Since the sheetlike film 7 has softened on heating, its both ends 7a and 7b extend between the outer periphery of the cylindrical member 6 and the inner periphery of the tubular mold member 9 in the peripheral direction of these members 6 and 7, until they fuse one another to come joined. Also, since the sheetlike film 7 and the linear films 8 are both formed of the like base material, they fuse one another to come into close contact. As the result, the both ends 7a and 7b of the sheetlike film 7 come to have no difference in height, and the gap d between the cylindrical member 6 and the tubular mold member 9 finally comes equal to the thickness of the films 7 and 8 (see FIG. 6C).

This embodiment has been described giving an example in which the heating furnace 10 is used, having the most simple construction as a heating means. Instead, a heating means employing induction heating or lamp heater heating may also be used in order to shorten the heating time.

After the heating step has thus been completed, the above assemblage is cooled.

Figure 7:
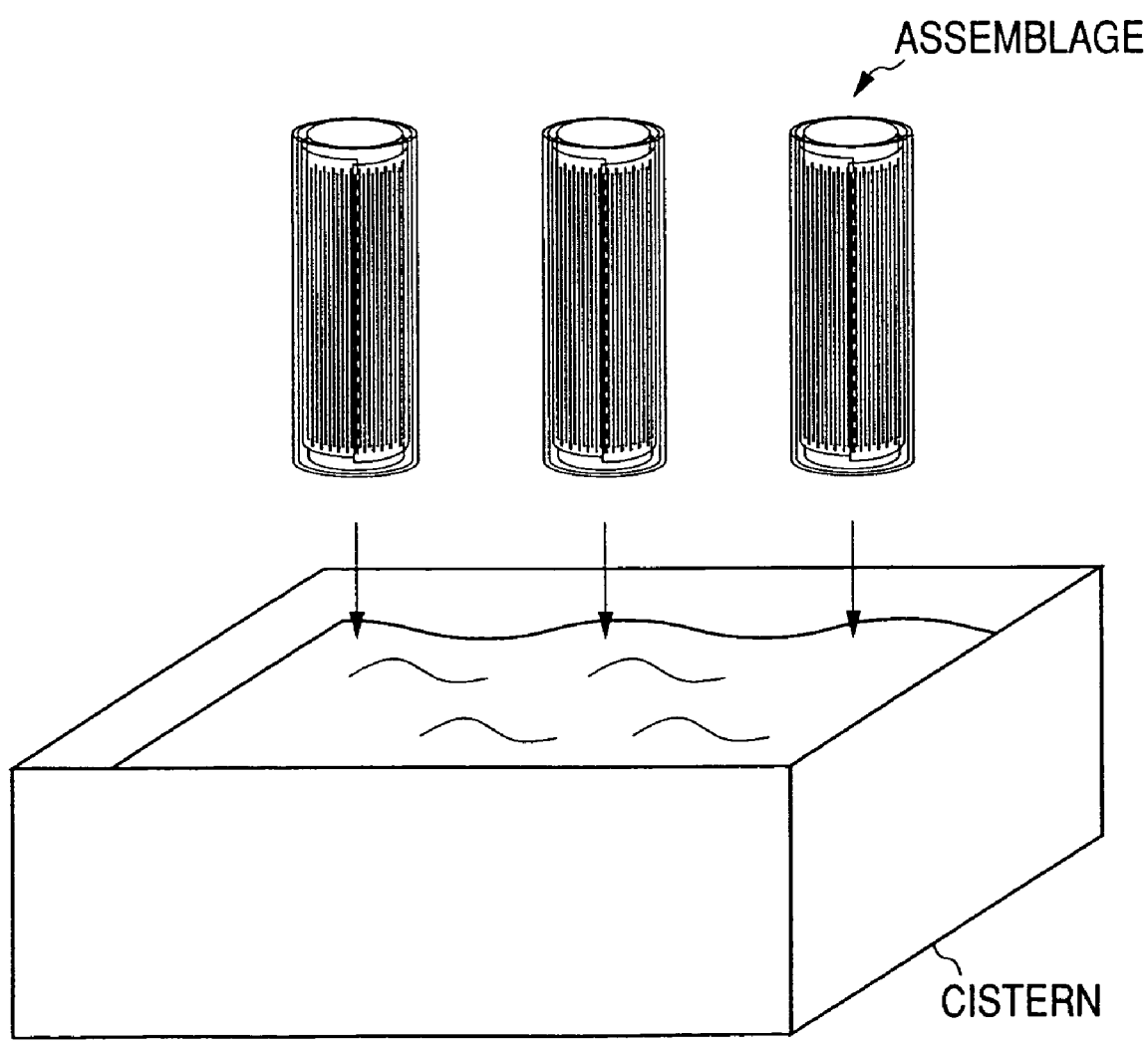
FIG. 7 illustrates the step of cooling the sheetlike film and the linear films.

Here, the assemblage may be cooled by bringing it into natural cooling after the heating step has been completed, but may rapidly be cooled in order to shorten the cooling time. In this embodiment, as shown in FIG. 7, the assemblage on which the heating step has been completed is immersed in a liquid coolant held in a cistern, to cool the assemblage at a cooling rate of 200° C./minute until it comes to a temperature around room temperature.

Thereafter, the cylindrical member 6 with films is pulled out of the tubular mold member 9, and the sheetlike film 7 with linear films, having been wound on the outer periphery 6a of the cylindrical member 6, is taken out. The film 7 with linear films thus taken out has good joins between the overlapped portions 7a and 7b and between the sheetlike film 7 and the linear films 8 to come into a belt (tubular or cylindrical).

Thus, a transport belt 1 (see FIGS. 8 and 9) according to this embodiment is obtained which has a base member layer formed of the film 7 made into a belt and, provided on its surface, electrodes 2 and 3 (see FIG. 9) formed of the linear films 8. This transport belt has a wall thickness dimension of 100 µm (the dimension of thickness of films 7 and 8), and has a dimensional tolerance of within ±10 µm over the whole, having substantially uniform wall thickness.

Figure 8:
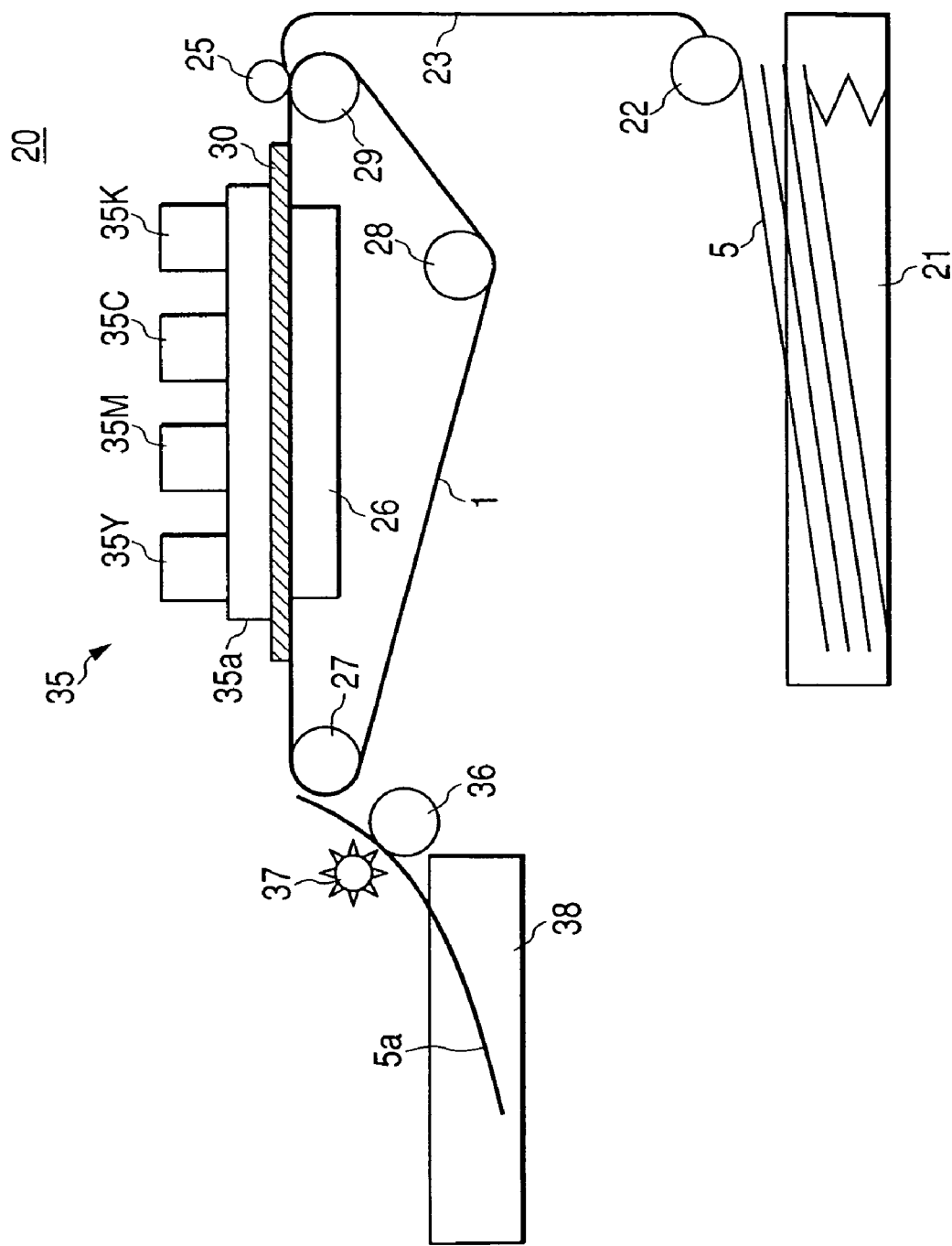
FIG. 8 illustrates the whole construction of an image-forming apparatus in which the transport belt of the present invention is used.
Figure 9:
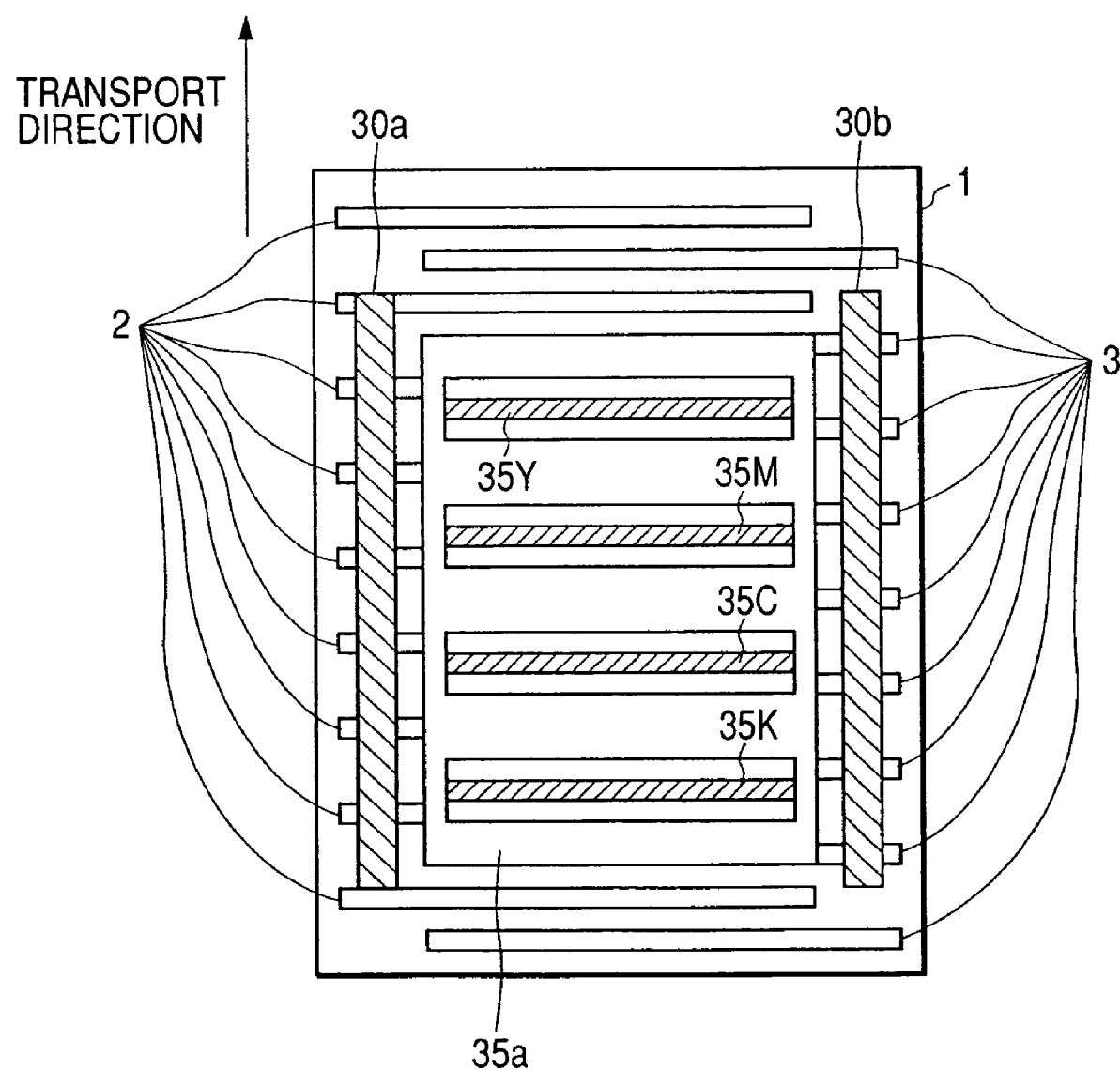
FIG. 9 is a plan view showing an image-recording area of the image-forming apparatus shown in FIG. 8.

An ink-jet image-forming apparatus in which the transport belt manufactured through the foregoing manufacturing process is described below. FIG. 8 illustrates the whole construction of an ink-jet image-forming apparatus in which the transport belt of this embodiment is used. FIG. 9 is a plan view showing part of the image-forming apparatus shown in FIG. 8.

As shown in FIG. 8, an image-forming apparatus 20 has a paper pick-up section 21 in which recording mediums sheets of recording paper 5 are piled up. The sheets of recording paper 5 piled up in the paper pick-up section 21 are so set as to be fed sheet by sheet from the top by the rotation of a feed roller 22. The recording paper 5 thus fed is transported by a lower transport guide 23 to a position where it is held between a pinch roller 25 and the transport belt 1 put over a pressure roller 29. The transport belt 1 is put over a drive roller 27, a follower roller 28 and the pressure roller 29, and is so set as to be rotatingly driven by the drive roller 27. The transport belt 1 is rotated as the drive roller 27 is driven, and transports the recording paper 5 to a position on a platen 26 at which the image recording is started.

At the upper part of the platen 26, a group of recording heads 35 which form images on the recording paper 5 are arranged interposing the transport belt 1 between them and the platen 26. The group of recording heads 35 consists of a recording head 35K for black, a recording head 35C for cyan, a recording head 35M for magenta and a recording head 35Y for yellow. These recording heads are arranged at given intervals in order from the upstream side of the transport direction of the recording paper 5, and are attached to a recording head holder 35a. Also, each recording head is what is called a full-line type recording head, which has a plurality of recording elements over the full width of the recording area of the recording paper 5. These recording heads are what is called ink-jet recording heads in which the recording elements are constituted of nozzles from ejection orifices of which the ink is ejected by a fluid ejection means such as an electricity-heat conversion element.

As shown in FIG. 9, charging brushes 30a and 30b are also provided on the top surface of the transport belt at the both sides in the direction of transportation as electrical-feed means for applying a high voltage to each of the electrodes 2 and 3 of the transport belt 1 so that an electrostatic force can thereby be produced in the transport belt. Incidentally, in FIG. 9, power sources connected to these charging brushes 30a and 30b and wirings therefor are omitted from illustration. Also, the charging brushes 30a and 30b are constituted of a set of electrode plate and ground plate (both not shown) which are made of conductive metal, and positive or negative voltage is applied to a feed spot of the electrode plate. A feed spot of the ground plate is grounded.

In the image-forming apparatus 20 constructed as described above, the recording paper 5 fed onto the transport belt 1 is attracted onto the transport belt by the action of static electricity produced across the electrodes 2 and 3 of the transport belt 1 by charging with the brushes 30a and 30b, and is transported by the transport belt 1 while images are formed by the recording heads 25.

The recording paper 5 on which the images have been formed is delivered while being held between an output roller 36 and a spur 37 which is a rotator provided in pressure contact with the former, and outputted to an output tray 38.

In the transport belt 1 of this embodiment, since both the sheetlike film 7 which forms the base member layer and the linear films 8 which form the electrodes are comprised of the thermoplastic material, the both can readily be joined by heating them. This enables manufacture of the transport belt in a uniform thickness without causing any fold. Thus, the transport belt 1 of this embodiment can be improved in attraction of the recording medium 5, and enables the recording medium 5 to be transported in a high accuracy.

In the foregoing, what has been shown is an example in which the linear films 8 which form the electrodes are arranged on the surface of the sheetlike film 7 which forms the base member layer. Conversely, the transport belt may also be so constructed that the linear films 8 which form the electrodes are arranged on the back of the sheetlike film 7 which forms the base member layer. In such a case, it may be manufactured in the above manufacturing process by arranging a plurality of linear films 8 on the outer periphery 6a of the cylindrical member 6 in the shape of comb teeth and winding the sheetlike film 7 thereon.

Materials applicable in the respective members used in this embodiment are described below.

As the thermoplastic material (thermoplastic resin material) which forms the sheetlike film 7 and the linear films 8, usable are polyethylene, polypropylene, polymethylpentene-1, polystyrene, polyamide, polycarbonate, polysulfone, polyarylate, polyethylene terephthalate, polybutylene terephthalate, polyphenylene sulfide, polyether sulfone, polyether nitrile, various fluorine resins, thermoplastic polyimide materials, polyether ether ketone, thermotropic liquid-crystal polymers and polyamic acid, as well as alloy resins obtained by compounding or mixing any of these thermoplastic resins in a desired proportion. In particular, systems in which ion-conductive polymers have been blended for the purpose of controlling conductivity and so forth are also most suitable. Also usable are those in which at least one organic or inorganic fine powder has been compounded for the purpose of providing the above resin materials with heat-resistant reinforcement, conductivity and heat-conducting properties.

Here, as the organic fine powder, condensation polyimide powder is preferred. As the inorganic fine powder, inorganic spherical fine particles such as carbon black powder, magnesium oxide powder, magnesium fluoride powder, silicon oxide powder, aluminum oxide powder and titanium oxide powder, and fibrous particles such as carbon fiber and glass fiber, and wiskery powders such as potassium 6-titanate, potassium 8-titanate, silicon carbide and silicon nitride are preferred.

In this embodiment, an example in which aluminum is used as the material of the cylindrical member 6 has been given, and an example in which stainless steel is used as the material of the tubular mold member 9 has been given. Besides these materials, combination of a resin material such as polytetrafluoroethylene with a glass material may also be used.

Second Embodiment

Figure 10:
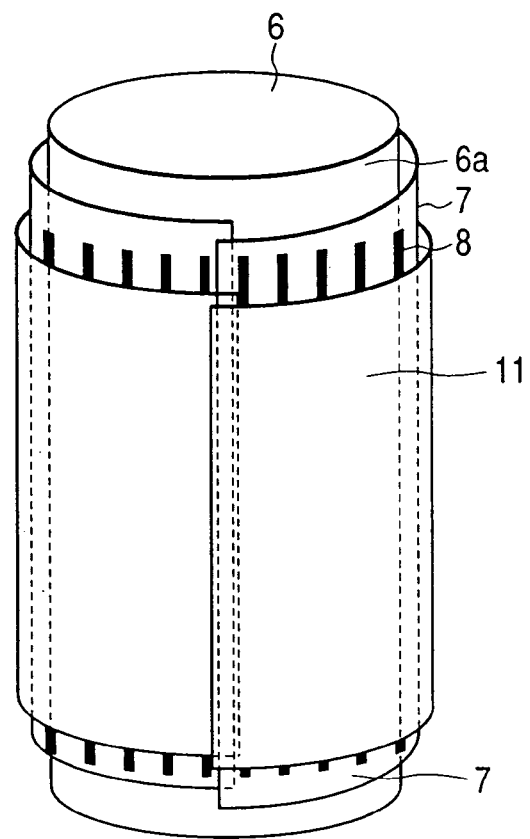
FIG. 10 is a perspective illustration of how first and second sheetlike films serving as base member layers of a transport belt according to Second Embodiment of the present invention and linear films serving as an electrode are wound around a cylindrical member.
Figure 11:
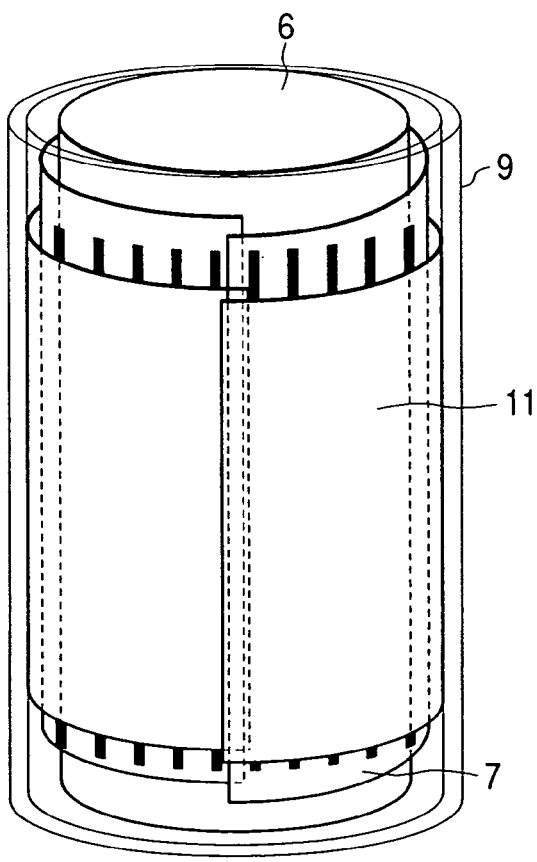
FIG. 11 is a see-through, perspective illustration of how the cylindrical member around which the sheetlike film and so forth have been wound as shown in FIG. 10 is inserted into a tubular mold member.

FIGS. 10 and 11 are illustrations used to describe Second Embodiment of the transport belt according to the present invention. In FIGS. 10 and 11, the same components as those in First Embodiment are denoted by the same reference numerals as those. The transport belt of this embodiment is characterized in that linear films 8 which form comb-tooth-shaped electrodes are provided between two sheetlike films 7 and 11 so that the belt can have a stronger attraction transport power.

A cylindrical member 6 in this embodiment is also made of aluminum and a tubular mold member 9 is also made of stainless steel. These are made to have the same coefficients of thermal expansion and component dimensions as those in First Embodiment.

Steps of manufacturing the transport belt of this embodiment are described below.

First, as shown in FIG. 10, a first sheetlike film 7 which forms a first base member layer, comprised of thermoplastic PVdF resin and provided in the same length and breadth dimensions as the case of First Embodiment, is wound on the outer periphery 6*a* of the cylindrical member 6 in such a way that the film itself overlaps at its both ends. Also, in this embodiment, the sheetlike film 7 has a thickness of 50 μm.

Next, as shown in FIG. 10, on the surface of the sheetlike film 7 wound on the cylindrical member 6, thermoplastic linear films 8 cut in lines of 50 μm in thickness, 6 mm in width and 200 mm in length are arranged at intervals of 3 mm one another in the shape of comb teeth in such a way that they are alternately shifted in the width direction of the sheetlike film 7. The films 8 are then thermocompression bonded by means of a 170° C. hot plate to attach them provisionally to the film 7. As a base material of the linear films 8, like First Embodiment, the PVdF resin is used in which particles of KETJEN BLACK (trade name), which is high-performance conductive carbon black, are mixed.

Subsequently, on the first sheetlike film 7 with films 8, a thermoplastic, second sheetlike film 11 of 50 μm in layer thickness, cut into a sheet of 945 mm×230 mm in length and breadth dimensions, which forms a second base member layer is so wound by one round that it holds the linear films 8 between it and the film 7. Here, the sheetlike film 11 is made to overlap at its both ends in a width of 4 mm.

In this embodiment, the sheetlike films 7 and 11 and linear films 8 have volume resistivities set in the following way. First, the first sheetlike film 7 and linear films 8 are made to have a volume resistivity of $1.0\times10^{13}$ Ω·cm and a volume resistivity of $1.0\times10^{2}$ Ω·cm, respectively, like those in First Embodiment. As for the second sheetlike film 11, it is made to have a volume resistivity of $1.0\times10^{10}$ Ω·cm, which is a value of a little lower resistance (a lower dielectric) than the first sheetlike film 7 so that electric charges may readily be generated on the top surface of the transport belt 1. The second sheetlike film 11 is formed of a material comprising PVdF resin compounded appropriately with an ion conductive polymer, in order to make the film 11 have a lower resistivity than the first sheetlike film 7.

Subsequently, as shown in FIG. 11, the cylindrical member 6 around which these films 7 and 11 with films 8 are kept wound is inserted into the hollow part of the tubular mold member 9. This assemblage is heated and then cooled by the same means as those in First Embodiment. As the result, the respective sheetlike films 7 and 8 themselves join at their overlapped portions and simultaneously the films 7, 8 and 11 join to each other at their part coming into contact with each other. Thus, a transport belt of triple-layer structure consisting of the sheetlike films 7 and 11 and the linear films 8 is obtained.

The transport belt of this embodiment has been used as the transport belt of the image-forming apparatus shown in FIGS. 8 and 9, where it has been ascertained that this transport belt can attain attraction about twice the attraction attained by the transport belt of First Embodiment when an A4-size OHP sheet is used as the recording medium to be transported. The reason therefor is considered as follows: In the case of the transport belt of First Embodiment, the electrodes 2 and 3 have only equal conducting paths between them, and hence only weak electric current flows across the positive and negative electrodes 2 and 3, so that only slight electric charges have been generated on the surface. On the other hand, the transport belt of this embodiment has on the attracting-surface side the second sheetlike film 11, which has lower volume resistivity than the first sheetlike film 7, and hence the conducting paths have concentrated on the attracting-surface side, so that more electric charges can be generated on the attracting surface.

Third Embodiment

Figure 12:
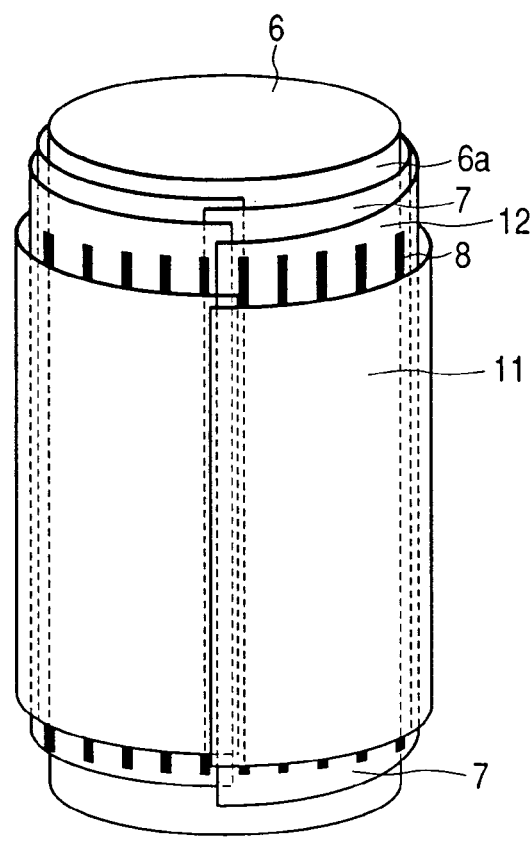
FIG. 12 is a perspective illustration of how first and second sheetlike films serving as base member layers of a transport belt according to Third Embodiment of the present invention, linear films serving as an electrode and a sheetlike film serving as an intermediate layer are wound around a cylindrical member.
Figure 13:
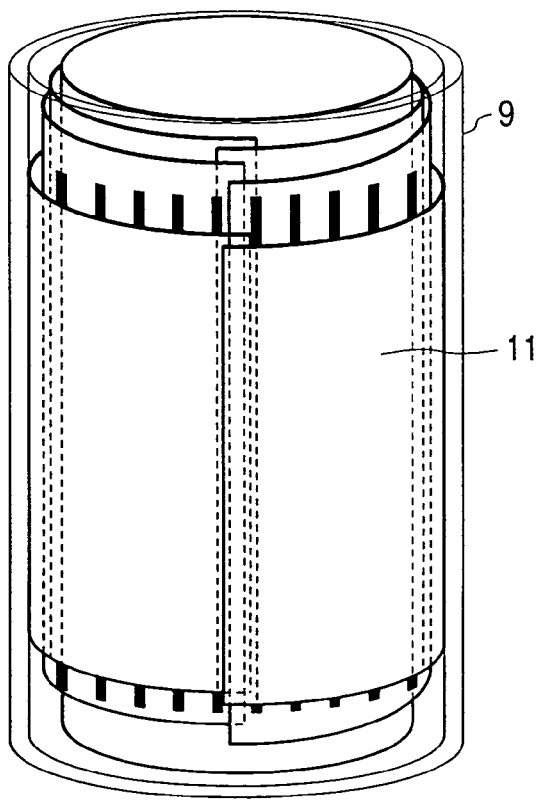
FIG. 13 a see-through, perspective illustration of how the cylindrical member around which the sheetlike film and so forth have been wound as shown in FIG. 10 is inserted into a tubular mold member.

FIGS. 12 and 13 are illustrations used to describe Third Embodiment of the transport belt according to the present invention. In FIGS. 12 and 13, the same components as those in First Embodiment are denoted by the same reference numerals as those. The transport belt of this embodiment is characterized in that the transport belt having the comb-tooth-shaped electrodes are improved in its surface smoothness (in particular, surface profile) so that the belt can have a stronger attraction transport power and also the recording medium can be transported at a high accuracy to achieve higher image quality of the images to be recorded by means of the image-forming apparatus.

A cylindrical member 6 in this embodiment is also made of aluminum and a tubular mold member 9 is also made of stainless steel. These are made to have the same coefficients of thermal expansion and component dimensions as those in First Embodiment except that the tubular mold member 9 has an inner diameter of 300.8 mm.

Steps of manufacturing the transport belt of this embodiment are described below.

First, as shown in FIG. 12, a first sheetlike film 7 which forms a first base member layer, comprised of thermoplastic PVdF resin and provided in the same length and breadth dimensions as the case of First Embodiment, is wound on the outer periphery 6*a* of the cylindrical member 6 in such a way that the film itself overlaps at its both ends. Also, in this embodiment, the sheetlike film 7 has a thickness of 50 μm.

Figure 14:
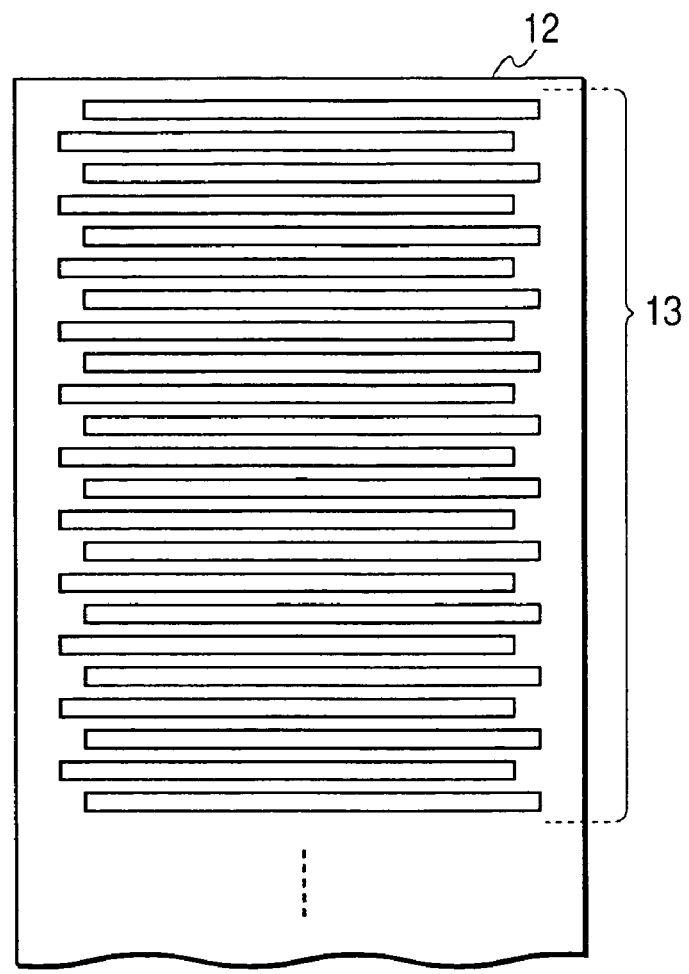
FIG. 14 is a plan view showing the sheetlike film serving as an intermediate layer, shown in FIG. 12 and so forth.

Next, on this film 7, a sheetlike film 12 which forms an intermediate layer comprised of the same material, and has the same volume resistivity, as the film 7 is so wound by one round that the film 12 itself overlap at its both ends. This sheetlike film 12 has the same length and breadth dimensions as the first sheetlike film 7, provided that, as shown in FIG. 14, the sheetlike film 12 is provided with a plurality of fitting openings 13 in which linear films 8 described later are to be fitted; the openings being arranged at intervals of 3 mm in the shape of comb teeth in such a way that they are alternately shifted in the width direction of the sheetlike film 12. These fitting openings 13 are formed in the film 12 by means of a punching tool and a film set jig (both not shown); the openings being so formed as to be 6 mm in width and 200 mm in length.

Next, as shown in FIG. 12, thermoplastic linear films 8 cut in lines of 50 μm in thickness, 6 mm in width and 200 mm in length are fitted in the fitting openings 13 of the film 12 wound on the cylindrical member 6. As a base material of the linear films 8, like First Embodiment, the PVdF resin is used in which particles of KETJEN BLACK (trade name), which is high-performance conductive carbon black, are mixed.

Subsequently, on the first sheetlike film 12, a thermoplastic, second sheetlike film 11 of 50 μm in layer thickness, cut into a sheet of 945 mm×230 mm in length and breadth dimensions, which forms a second base member layer is wound by one round. Here, the sheetlike film 11 is made to overlap at its both ends in a width of 4 mm.

In this embodiment, the sheetlike films 7, 11 and 12 and linear films 8 have volume resistivities set in the following way. First, the first sheetlike film 7 and the sheetlike film 12 which forms the intermediate layer are made to have a volume resistivity of $1.0\times10^{13}$ Ω·cm, and the linear films 8 are made to have a volume resistivity of $1.0\times10^{2}$ Ω·cm. As for the second sheetlike film 11, it is made to have a volume resistivity of $1.0\times10^{10}$ Ω·cm in the same manner as in Second Embodiment.

Incidentally, FIGS. 12 and 13 show an example in which the respective sheetlike films 7, 11 and 12 themselves each overlap at the like position with respect to the position in the peripheral direction of the cylindrical member 6. These, however, may overlap at any position in the peripheral direction. For example, in order to make the transport belt having been completed have a higher thickness uniformity, the sheetlike films 7, 11 and 12 may be made to overlap at positions appropriately scattered in the peripheral direction of the cylindrical member 6.

Subsequently, as shown in FIG. 13, the cylindrical member 6 around which these films 7, 11 and 12 with films 8 are kept wound is inserted into the hollow part of the tubular mold member 9. This assemblage is heated and then cooled by the same means as those in First Embodiment. As the result, the respective sheetlike films 7, 11 and 12 themselves join at their overlapped portions and simultaneously the films 7, 8, 11 and 12 join to each other at their part coming into contact with each other. Thus, a transport belt of triple-layer structure consisting of the sheetlike films 7, 11 and 12 and the linear films 8 is obtained. A sectional view of this transport belt along the peripheral direction is shown in FIG. 15.

The transport belt of this embodiment has been used as the transport belt of the image-forming apparatus shown in FIGS. 8 and 9, where it has been ascertained that this transport belt can attain attraction about twice the attraction attained by the transport belt of First Embodiment when an A4-size OHP sheet is used as the recording medium to be transported. The mechanism by which this can be attained is considered to be the same as the mechanism explained in Second Embodiment. In addition, the transport belt of this embodiment is so constructed that the electrode films 8 have been fitted in the fitting openings 13 of the film 12. Hence, the sheetlike film 12 which forms the intermediate layer also comprised of a thermoplastic material, which is present in the spaces lying between the linear films 8 one another between the first sheetlike film 7 and the second sheetlike film 11, makes any unevenness not appear at the transport belt surface to make the surface uniform. As the result, the ink-shot position on the recording medium being transported by this transport belt can be improved in accuracy, and hence recorded images with a higher image quality can be formed.

Fourth Embodiment

Figure 15:
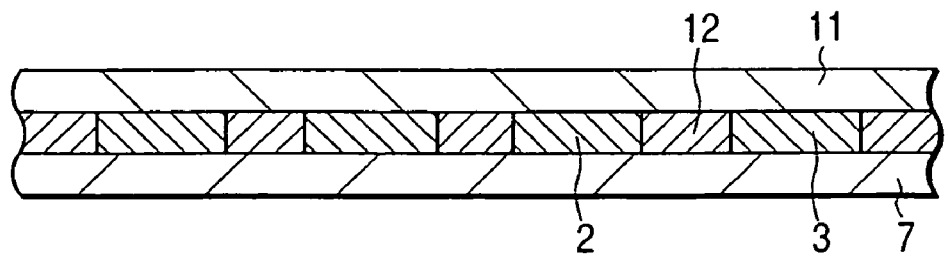
FIG. 15 is a sectional view of a transport belt according to Third Embodiment of the present invention.
Figure 16:
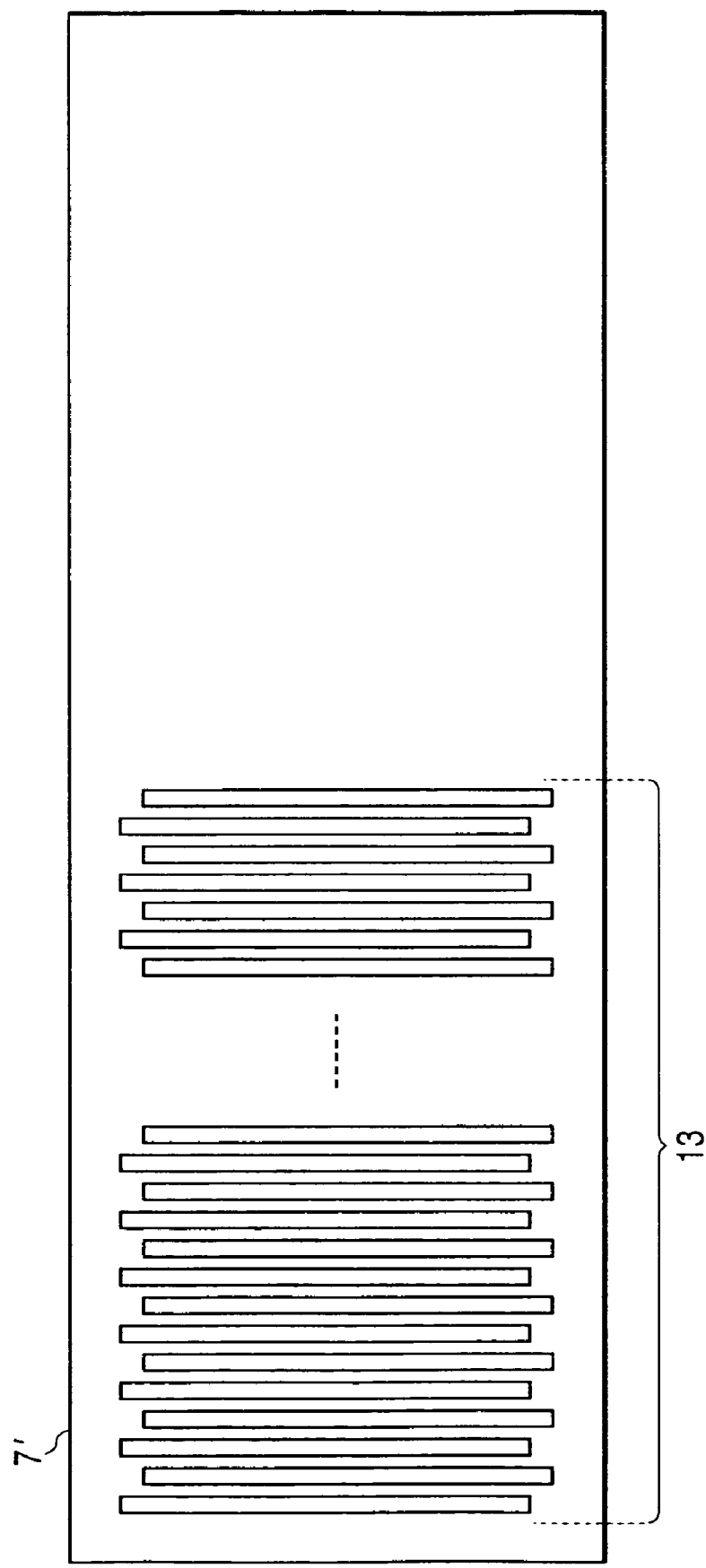
FIG. 16 is a plan view showing a modification of a sheetlike film serving as an intermediate layer in the transport belt according to Third Embodiment of the present invention.

FIG. 16 is a plan view of a sheetlike film used as a modification of the sheetlike film shown in FIG. 15.

The sheetlike film 7' used in this modification has a shape that the part corresponding to the first sheetlike film 7 which forms the first base member layer, shown in FIG. 12, and the part corresponding to the sheetlike film 12 which forms the intermediate layer are linked in a single sheet. Accordingly, the sheetlike film 7' has a length for the first sheetlike film 7 and sheetlike film 12 put together, and a plurality of fitting openings 13 are formed only in the part corresponding to the sheetlike film 12 having a length which is half of the total length.

This sheetlike film 7' is wound in the following way. First, its part not provided with the fitting openings 13 (the part corresponding to the first sheetlike film 7) is wound by one round on the outer periphery 6a of the cylindrical member 6 (see FIG. 12). Then, its part provided with the fitting openings 13 (the part corresponding to the sheetlike film 12) is superposingly wound thereon. Accordingly, while two steps are required to wind the sheetlike films 7 and 12 which form the base member layer and the intermediate layer, respectively, in the example shown in FIG. 12, the sheetlike film 7' which forms both the base member layer and the intermediate layer can be wound in one step in this modification. This enables cost reduction in the manufacture of transport belts.

What is claimed is:

1. A method of forming a transport belt comprising a first base member layer formed of a film comprised of a thermoplastic material and wound in a cylindrical shape, and a plurality of electrodes arranged at given intervals in the shape of comb teeth on the outer periphery or inner periphery of the first base member layer, the method comprising preparing a linear film comprised of a thermoplastic material, cut in a line, as the electrodes and thermally fixing the linear film onto the first base member layer.

2. The method of forming a transport belt according to claim 1, wherein the linear film has a lower volume resistivity than the volume resistivity of the first base member layer.

3. The method of forming a transport belt according to claim 2, wherein the linear film has a volume resistivity which is lower than $1.0\times10^{5}$ Ω.cm.

4. The method of forming a transport belt according to claim 1, wherein a second base member layer formed of a film comprised of a thermoplastic material and wound in a cylindrical shape is so provided as to hold the linear film between said first base member layer and the second base member layer.

5. The method of forming a transport belt according to claim 4, wherein one of the first base member layer and the second base member layer is positioned on the outer peripheral side of the transport belt and the other is positioned on the inner peripheral side, and the volume resistivity of the base member layer positioned on the outer peripheral side of the transport belt is higher than that of the linear film and is lower than that of the base member layer positioned on the inner peripheral side of the transport belt.

6. The method of forming a transport belt according to claim 4, wherein an intermediate layer comprised of a thermoplastic material is provided both between the linear film adjoining to each other and between said first base member layer and said second base member layer.

7. The method of forming a transport belt according to claim 6, wherein the intermediate layer has the same volume resistivity as the volume resistivity of the thermoplastic material constituting said first base member layer.

8. The method of forming a transport belt according to any one of claims 1 to 7, wherein the base member layer and linear film have the same thermoplastic material.

* * * * *

UNITED STATES PATENT AND TRADEMARK OFFICE
CERTIFICATE OF CORRECTION

| | |
|---|---|
| PATENT NO. | : 7,048,821 B2 |
| APPLICATION NO. | : 10/867793 |
| DATED | : May 23, 2006 |
| INVENTOR(S) | : Kazutaka Takeuchi et al. |

It is certified that error appears in the above-identified patent and that said Letters Patent is hereby corrected as shown below:

COVER PAGE AT ITEM (30):
Foreign Application Priority Data, "2001/092906" should read --2001-092906--.

COLUMN 2:
Line 10, "serve" should read --serves--.

COLUMN 3:
Line 20, "wherein;" should read --wherein,--.

COLUMN 5:
Line 4, "the" (first occurrence) should be deleted.

COLUMN 10:
Line 12, "materials" should read --material--.

COLUMN 11:
Line 7, "mediums" should read --medium--.

COLUMN 12:
Line 2, "enables" should read --enable--.
Line 66, "in" should read --in the--.

COLUMN 13:
Line 15, "mm" should read --mm from--.

COLUMN 14:
Line 40, "overlap" should read --overlaps--.

UNITED STATES PATENT AND TRADEMARK OFFICE
CERTIFICATE OF CORRECTION

PATENT NO. : 7,048,821 B2
APPLICATION NO. : 10/867793
DATED : May 23, 2006
INVENTOR(S) : Kazutaka Takeuchi et al.

It is certified that error appears in the above-identified patent and that said Letters Patent is hereby corrected as shown below:

COLUMN 15:
Line 2, "forms" should read --form--.

Signed and Sealed this

Thirteenth Day of March, 2007

JON W. DUDAS
*Director of the United States Patent and Trademark Office*